(12) United States Patent
Williams

(10) Patent No.: US 12,622,368 B2
(45) Date of Patent: May 12, 2026

(54) RAKE/VACUUM APPARATUS

(71) Applicant: Cody Mathew Williams, Birmingham, MI (US)

(72) Inventor: Cody Mathew Williams, Birmingham, MI (US)

( * ) Notice: Subject to any disclaimer, the term of this patent is extended or adjusted under 35 U.S.C. 154(b) by 321 days.

(21) Appl. No.: 18/418,960

(22) Filed: Jan. 22, 2024

(65) Prior Publication Data

US 2024/0188512 A1 Jun. 13, 2024

Related U.S. Application Data

(63) Continuation-in-part of application No. 18/079,248, filed on Dec. 12, 2022.

(51) Int. Cl.
*A01G 20/47* (2018.01)
*A01D 7/02* (2006.01)

(52) U.S. Cl.
CPC .............. *A01G 20/47* (2018.02); *A01D 7/02* (2013.01)

(58) Field of Classification Search
CPC .................................. A01G 20/47; A01D 7/02
See application file for complete search history.

(56) References Cited

U.S. PATENT DOCUMENTS

| | | | | |
|---|---|---|---|---|
| 5,054,159 A | * | 10/1991 | Richardson | A47L 5/14 |
| | | | | 15/393 |
| 5,272,858 A | * | 12/1993 | Bonis | E01H 1/0809 |
| | | | | 15/340.2 |

| | | | | |
|---|---|---|---|---|
| 5,437,078 A | * | 8/1995 | Courcelles | A47L 13/52 |
| | | | | 15/328 |
| 5,768,748 A | * | 6/1998 | Silvera | A01K 13/001 |
| | | | | 119/664 |
| 5,991,973 A | * | 11/1999 | Simpson | A47L 9/0673 |
| | | | | 15/344 |
| 6,280,532 B1 | * | 8/2001 | Allen | A01G 20/47 |
| | | | | 15/328 |
| 7,341,612 B2 | * | 3/2008 | Nhan | A47L 9/1436 |
| | | | | 15/348 |
| 7,814,615 B1 | * | 10/2010 | Ries | A47L 5/14 |
| | | | | 15/327.5 |
| 9,247,690 B1 | * | 2/2016 | Awad | A01G 20/47 |
| 9,585,308 B2 | * | 3/2017 | King, Jr. | A47L 7/00 |

(Continued)

FOREIGN PATENT DOCUMENTS

| | | | | |
|---|---|---|---|---|
| DE | 202009004782 U1 | * | 7/2009 | A01G 20/47 |
| FR | 2865748 A1 | * | 8/2005 | A01G 20/47 |

(Continued)

*Primary Examiner* — Marc Carlson
(74) *Attorney, Agent, or Firm* — Eric Hanscom

(57) ABSTRACT

A combination rake/refuse collector has a rake portion which traps leaves and other debris, a handle portion which contains a hollow tube, a connector portion which connects the hollow tube to a vacuum unit, and a storage/processing container. The vacuum unit and storage processing container are carried via a shoulder harness with two straps on the back of user. The vacuum unit sucks leaves and other debris collected by the rake portion, through the hollow tube and the connector portion, and directs them to the vacuum storage bag where they are shredded and exhausted into the leaf vacuum bag. The handle portion allows the user to direct the rake portion.

13 Claims, 19 Drawing Sheets

(56) References Cited

U.S. PATENT DOCUMENTS

| | | | | |
|---|---|---|---|---|
| 2002/0108211 A1* | 8/2002 | Svoboda | E01H 1/0836 | |
| | | | | 416/235 |
| 2004/0154125 A1* | 8/2004 | Houvener | A47L 5/14 | |
| | | | | 15/339 |
| 2005/0177973 A1* | 8/2005 | Tate | A47L 9/1427 | |
| | | | | 15/330 |
| 2007/0157424 A1* | 7/2007 | Mottahedeh | A01G 20/47 | |
| | | | | 383/103 |
| 2008/0022481 A1* | 1/2008 | Reeves | E01H 1/0836 | |
| | | | | 15/330 |
| 2008/0072396 A1* | 3/2008 | Baer | B02C 18/16 | |
| | | | | 15/246.2 |
| 2008/0148513 A1* | 6/2008 | Shaffer | A01G 20/47 | |
| | | | | 15/319 |
| 2008/0152487 A1* | 6/2008 | Shaffer | F04D 25/084 | |
| | | | | 415/208.1 |
| 2009/0071115 A1* | 3/2009 | Freewalt | A01D 7/00 | |
| | | | | 56/13.3 |
| 2012/0138717 A1* | 6/2012 | Svoboda | A01G 20/47 | |
| | | | | 241/56 |
| 2013/0017079 A1* | 1/2013 | Armstrong | A47L 5/14 | |
| | | | | 415/204 |
| 2013/0185892 A1* | 7/2013 | Walker | A01G 20/47 | |
| | | | | 15/330 |
| 2015/0342433 A1* | 12/2015 | Blackwell, Jr. | A47L 9/1436 | |
| | | | | 55/495 |
| 2018/0249646 A1* | 9/2018 | Zhang | A01G 20/47 | |
| 2019/0021566 A1* | 1/2019 | Poole | A45F 3/02 | |
| 2022/0159917 A1* | 5/2022 | Steinke | A47L 9/08 | |
| 2023/0122554 A1* | 4/2023 | Williams | A01D 7/00 | |
| | | | | 56/400.01 |

FOREIGN PATENT DOCUMENTS

| | | | | | |
|---|---|---|---|---|---|
| GB | | 2521249 A | * | 6/2015 | E01H 1/0809 |
| WO | WO-2011117660 A2 | * | 9/2011 | E01H 1/08 |

* cited by examiner

RAKE/VACUUM APPARATUS

CROSS REFERENCE TO RELATED APPLICATIONS

This utility patent application claims priority back to US Utility No. 19, filed 12 Dec. 2022, the contents of which are incorporated by reference into this application.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of devices for collecting leaves and other debris, then mulching and disposing of them, and more specifically toward a combination rake/vacuum apparatus that can be carried on the back of a user.

Statement of the Problem Solved

How to collect fallen leaves off a lawn or other part of a person's property has been a problem facing property owners for centuries. A more recent problem has arisen in stadiums and arenas where patrons purchase food and drinks in paper and plastic wrappers and cups, and the leave their debris, along with peanut shells, partially eaten food, popcorn, confetti and other debris under the stadium seats.

Prior Art

There is considerable prior art that attempts to collect leaves on a lawn. There are simple rakes, which require a user to physically contain the leaves (usually with one hand pressing the leaves against the rake) and lifting them into a trash can or other container. There are also motorized lawn tractors that can suck up cut grass and could be used to remove and store leaves, but these are expensive and not good for fine-tuned leaf cleanup.

U.S. Pat. No. 9,961,838 to Horth describes a lawn debris collection assembly having a plenum assembly configured to be positioned in close proximate relationship with a lawn surface having lawn debris lodged between lawn blades of a lawn. The plenum assembly is movable along the lawn surface and configured to house a positive air-pressure stream in such a way that the positive air-pressure stream is directed toward the lawn debris, and the positive air-pressure stream, in use, dislodges the lawn debris from between the lawn blades. The plenum assembly is also configured to house a negative air-pressure airstream in such a way that the negative air-pressure airstream, in use, flows from the plenum assembly to a debris-collection bag. The negative air-pressure airstream, in use, urges the lawn debris to move from the plenum assembly to the debris-collection bag. This device is quite complicated and is basically a vacuum cleaner at the end of a pole.

An equally cumbersome device is found in US 20160066513 to Gray, and U.S. Pat. No. 8,266,763 to Hays requires a large bag and an unwieldy suction device.

U.S. Pat. No. 7,814,615 to Ries is a patent that covers a blower attachment to a rake, which creates an air stream generated by air stream generating device to be directed into a loosely defined plane. The raking attachment comprises a generally triangular shaped top wall, an opposing triangular shaped bottom face, side walls and an inlet throat with the side walls joined to at least a portion of the top wall and the bottom face wherein the top wall, bottom face and side walls extend longitudinally from the inlet throat. The top wall also extends beyond a terminal end of the bottom face and terminates in an end wall that is disposed at an angle relative to the top wall. However, this invention does not have the capacity to pick up the leaves and dispose of them.

U.S. Pat. No. 8,266,763 to Hays describes a leaf and lawn vacuum bagger, however this invention does not provide a backpack and lacks a rake or vacuum and also fails to provide a biodegradable paper bag for leaf storage. U.S. Pat. No. 9,364,125 to Makita provides a backpack power apparatus but fails to have a rake, a vacuum and also does not provide a leaf bag. CN 212175647 teaches another backpack-style leaf cleaning device, but this invention fails to provide a rake or vacuum, and there is no bag for disposal of leaves.

However, none of the prior art offers an easy way for a person to collect leaves and other debris from a lawn in an effective manner without requiring a large and expensive vehicle such as a lawn tractor. The current invention provides a solution by combing a rake and a vacuum in a novel manner. The invention provided is a combination rake/refuse collector that has a rake portion which traps leaves and other debris, a handle portion which contains a hollow tube, a connector portion which connects the hollow tube to a vacuum unit/processing. The vacuum unit contains a battery-driven brushless motor that turns an alloy or plastic shredding impeller and is carried via two straps on the back of user. The shredding impeller has curved blades and redirect air from in input pipe to an exhaust pipe. This redirection causes a vacuum to form in the input pipe which sucks leaves and other debris collected by the rake portion, through the hollow tube and the connector portion, and directs them to shredding impeller, which mulches the leaves and then redirects the mulch into the leaf vacuum bag. The entire operation of the invention is made possible through the redirection of air from the input pipe to the exhaust pipe. The handle portion allows the user to direct the rake portion toward a bunch of leaves. The rake tines serve to flip the leaves up and back toward the vacuum intake, where it sucks them up. The bag is removable without removing the backpack to change out the bag, thereby facilitating easy and efficient disposal of leaves. The shredding impeller is powered by a battery that is contained in battery compartment on an outer surface of the unit, thereby allowing for easy and quick replacement of the rechargeable battery. The shredding impeller can be made from a number of products, including plastic, nylon and metal. It can be removed from the housing by a professional for replacement or sharpening.

In a particularly preferred embodiment, there is a Backpack Vacuum Processing Unit (which contains a Brushless Battery powered motor that drives an aluminum alloy debris shredding impeller) and the Debris Collection Bag/Box. The size of the rake is also important. In a particularly preferred embodiment, the rake has a width of 24", such that entire lawns can be raked easily and quickly, as opposed to the small, 8" rakes that are currently in use. The device can be designed to allow for interchangeable rake heads.

In a separate embodiment, the device has the handle portion removable from the connector portion through a quick-connect, then attached to the exhaust port to turn the leaf collector into a leaf blower. In this embodiment, the rake heads can be removed to allow the blast of air from the fan to blow the leaves.

By way of a basic description of the function of one embodiment of the invention, the leaves are collected with the tines of the leaf rake that flip the leaves up and back towards the Vacuum intake device that's incorporated into the underside of the Leaf Rake. The leaves are then sucked up into the Leaf Rake Handle which is also a hollow tube. The tube is connected to a flexible tube which the leaves pass through into the Backpack Vacuum Processing Unit, which is a Battery Powered Brushless Motor that drives an aluminum alloy debris shredding impeller, and also holds a Lithium-Ion rechargeable battery. After being shredded, the leaves are exhausted as mulch into the attached Leaf collection Bag. The leaf collection bag can be a bag or box and can be made from pretty much any paper/cardboard/paperboard or other biodegradable product. In a particularly preferred embodiment, the leaf collection device is 100% Recyclable, Biodegradable, Compostable, and Disposable. In a preferred embodiment, the bag is made of 2-Ply Paper, and can hold both wet and dry debris. Once the Leaf Collection Bag is filled with debris, a user can momentarily turn off the power switch and the bag can be easily removed from the Card Slot on the exhaust port and placed at the curb for trash pickup, set into a compost pile, or burned. A new Bag is easily unfolded, the card on the bag is slid into the card slot, turn the power switch back on and the leaf collection bag will inflate with the exhaust air, and a user can continue to rake your lawn.

The Rake/Vacuum & Handle Tube combination is unique and very important to the function of the invention and separates this invention from everything else out there. This use of these Bags is the first all 100% recycled paper Leaf Vacuum Bags attached to an Outdoor Power Tool.

There has thus been outlined, rather broadly, the more important features of the invention in order that the detailed description thereof may be better understood, and in order that the present contribution to the art may be better appreciated. There are additional features of the invention that will be described hereinafter, and which will form the subject matter of the claims appended hereto. The features listed herein, and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention.

DETAILED DESCRIPTION OF THE INVENTION

Figure 1:
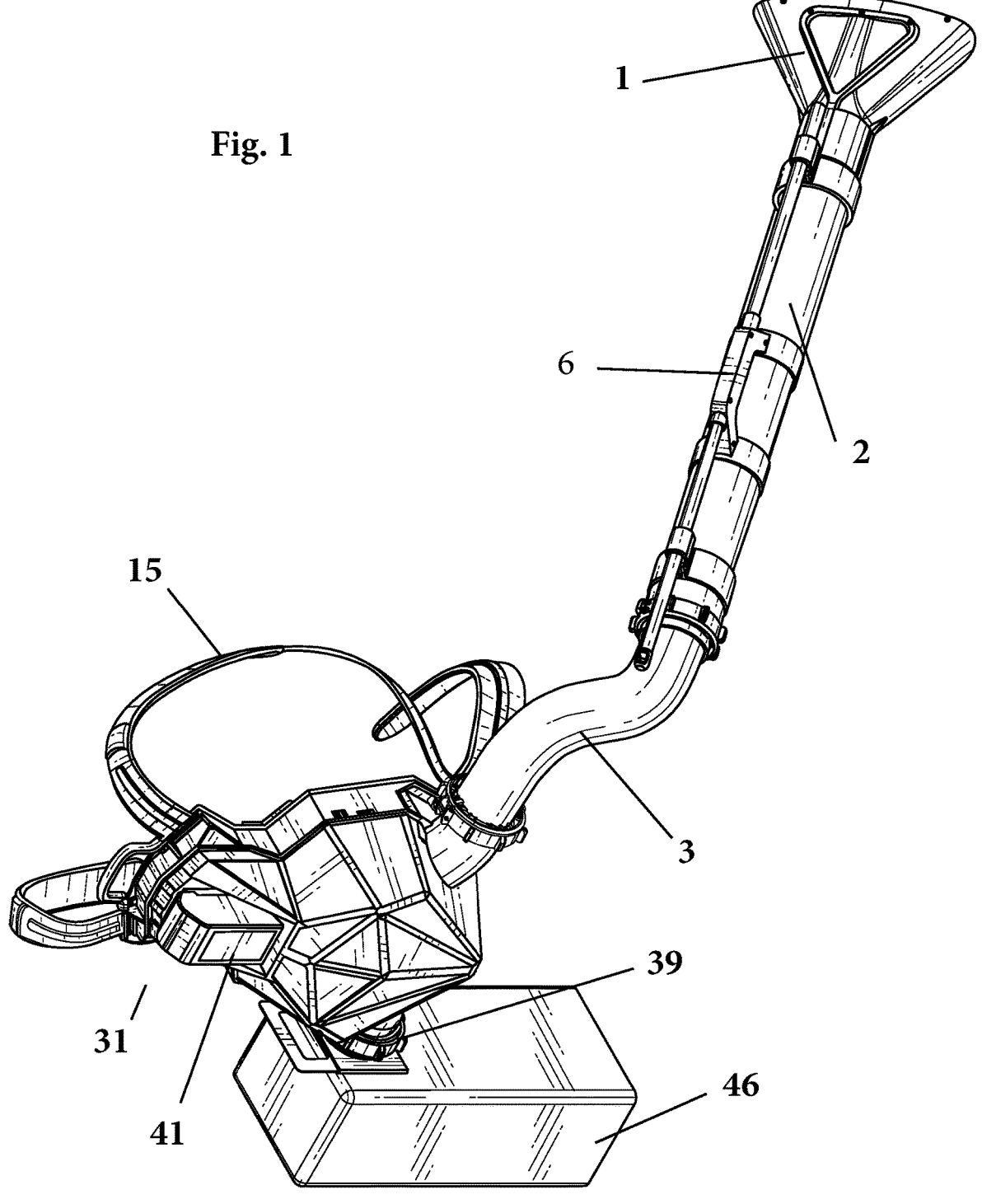
FIG. 1 is a perspective view of the rake/vacuum apparatus as being used by a person to rake/vacuum up leaves.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

FIG. 1 is a perspective view of the rake/vacuum apparatus as being used by a person to rake/vacuum up leaves. The invention has several parts. A rake portion 1 has a handle portion 2 which is connected to a vacuum unit 31 by a connector 3. The vacuum (contained in the vacuum unit 31) directs the leaves into a vacuum processing/storage unit. The bag/box unit 46 is attached to the vacuum by a quick-connect at the exhaust port 39. The vacuum portion has a battery 41 in one embodiment. Inside or attached to the handle portion is a hollow tube which sucks up leaves collected by the rake portion 1. The rake portion 1 can be made in various sizes and configurations, which are interchangeable heads. The hollow tube can be attached to the handle portion 2, or the handle portion 2 can be hollow. The handle portion 2 can have side handles 6 to allow a user to grip and control the apparatus. The connector 3 is flexible, such that users with the vacuum and storage bag on their backs can use the handle portion 2 to direct the rake portion 1 toward bunches of leaves or other debris. The bag/box unit 46 is in one embodiment made from 2-ply paper and is biodegradable. In another embodiment, it contains a shredder that chops up leaves that are brought into it by the vacuum container. In one embodiment, the vacuum can be powered by a 40V/4 am lithium-ion battery. The vacuum is held on the back of the user by a shoulder harness 15, which allows the user to use both hands to control the handle and rake portions of the invention.

Figure 2:
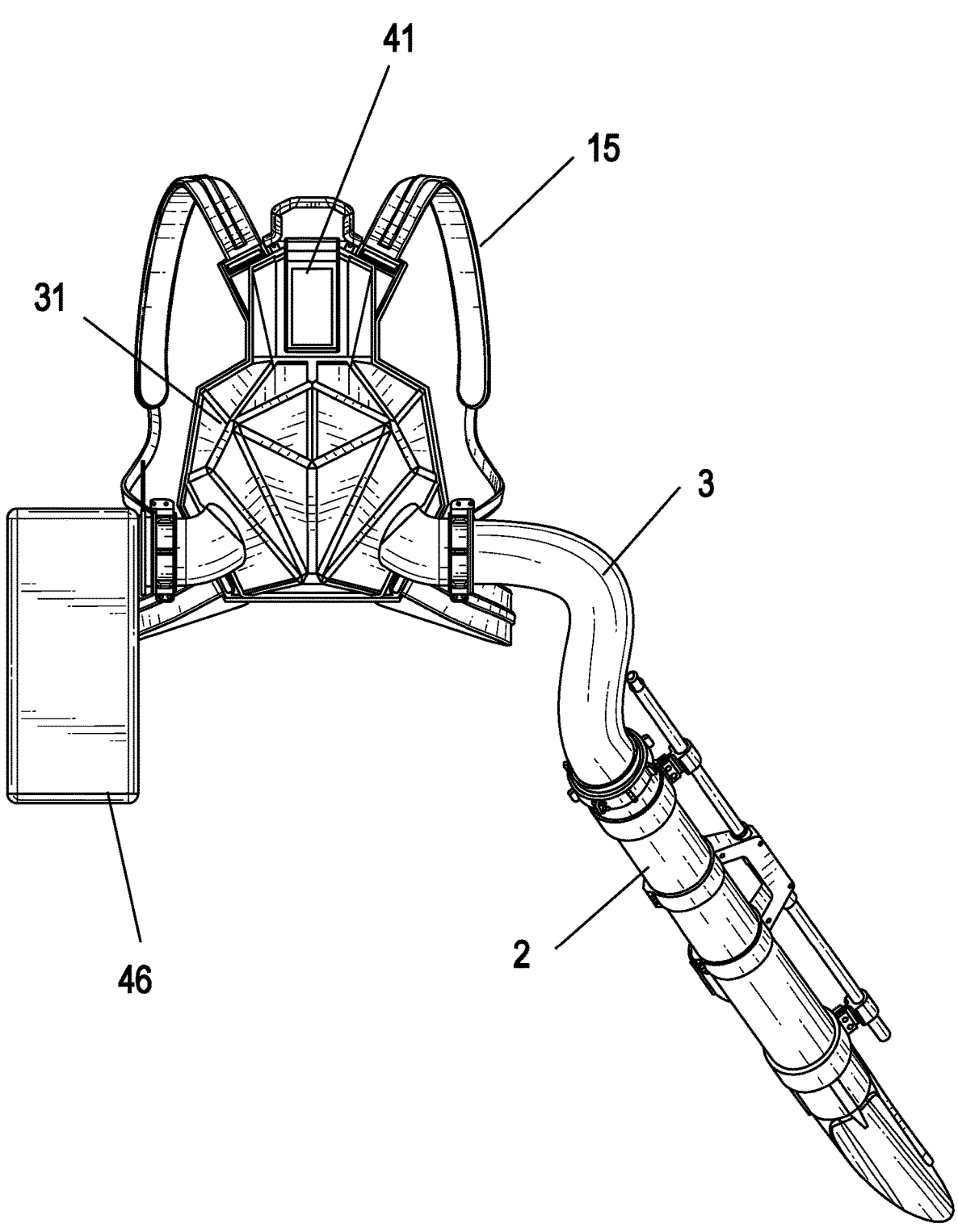
FIG. 2 is a perspective view of the rake/vacuum apparatus.

FIG. 2 is a perspective view of the rake/vacuum apparatus with the rake portion. The handle portion 2 has a hollow tube through which the leaves a vacuumed up. The handle portion 2 also has a side handle 6 that allows the user to effectively grasp and control the handle and rake portions of the invention. A quick-connect connects the upper portion of the handle portion 2 to the lower portion of the connector 3. The connector 3 is a flexible tube that takes leaves from the handle portion 2 and delivers them to the vacuum portion 31. Tines (not shown in this figure but referenced as 9 in FIG. 3) help collect the debris. A second quick connect connects the upper portion of the connector 3 to an inlet in the vacuum portion. On the outside of the vacuum portion, generally 31, a battery 41 powers the vacuum to create suction through the connector 3 and the handle portion 2, where a suction created in the vacuum sucks up leaves, peanut shells, plastic cups and other debris. A storage/collector box 46 stores debris processed through the vacuum unit 31. The storage/collector box 46 is designed to be biodegradable and can be made from any material such as 2-ply paper, cardboard, paperboard or a similar material. The bag/box unit 46 is perforated to allow for air to pass through, with perforations large enough to let air pass through, but not so large as to allow leaves or leaf particles to pass through. The storage/collector box is removable to allow a user to vacuum up enough leaves to fill the box, then quickly remove the full box and replace it with an empty box.

Figure 3:
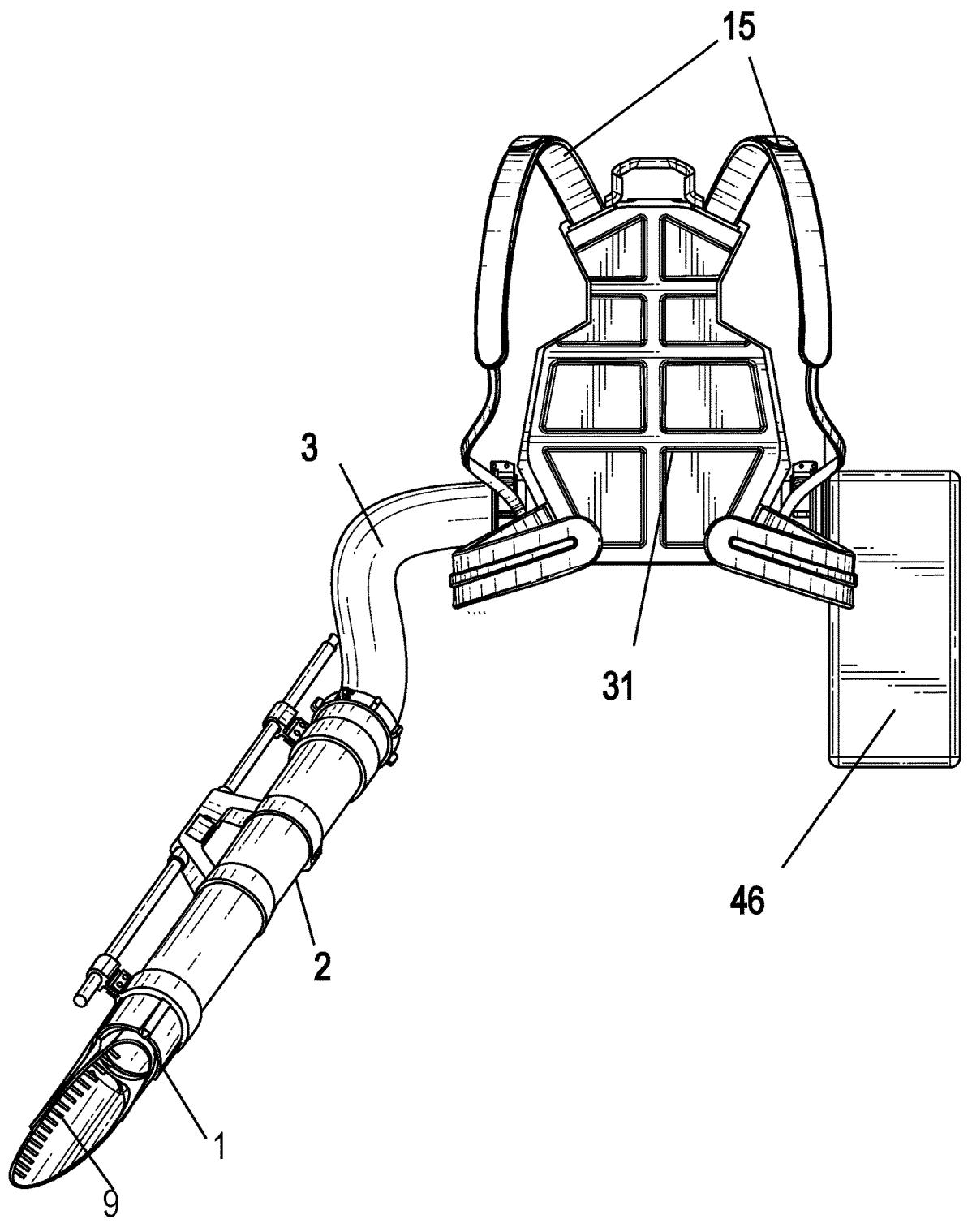
FIG. 3 is a perspective view of the rake portion of the rake/vacuum apparatus.

FIG. 3 is a perspective view of the rake portion of the rake/vacuum apparatus. The rake portion 1, includes a rake head and tines 9, which are used to collect debris, focusses the debris into a cavity in the handle portion 2 through which leaves and other debris are pulled by the vacuum (the vacuum unit generally referenced as 31) into the vacuum unit, where the debris are shredded and deposited into a bag 46. It should also be noted that the device works with both dry and moist leaves and a variety of other debris. The connection 3 between the rake portion and the handle portion allows rake portions of various shapes and sizes to be interchangeably attached to the handle portion.

Figure 4:
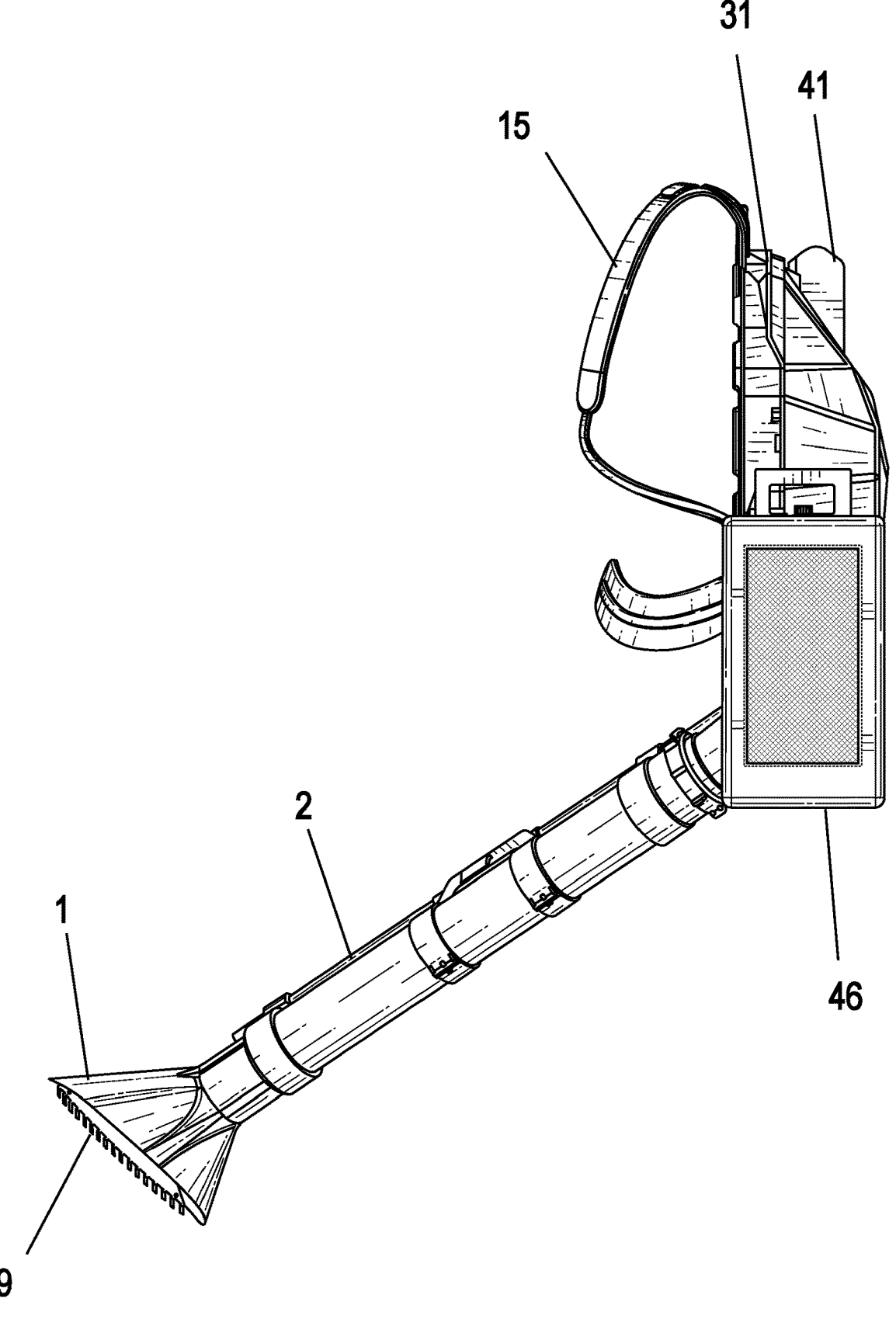
FIG. 4 is a perspective view of the rake/vacuum apparatus.

FIG. 4 is a side view of the invention. The rake portion 1 has tines 9 that help collect debris and direct it to suction created in the hollow tube handle portion 2. The user carries the device with shoulder straps 15. A rechargeable battery 41 in the vacuum unit 31 is easily replaced for continuous operation. Debris are mulched by an impeller (not shown in this figure) and collected in a bag 46.

Figure 5:
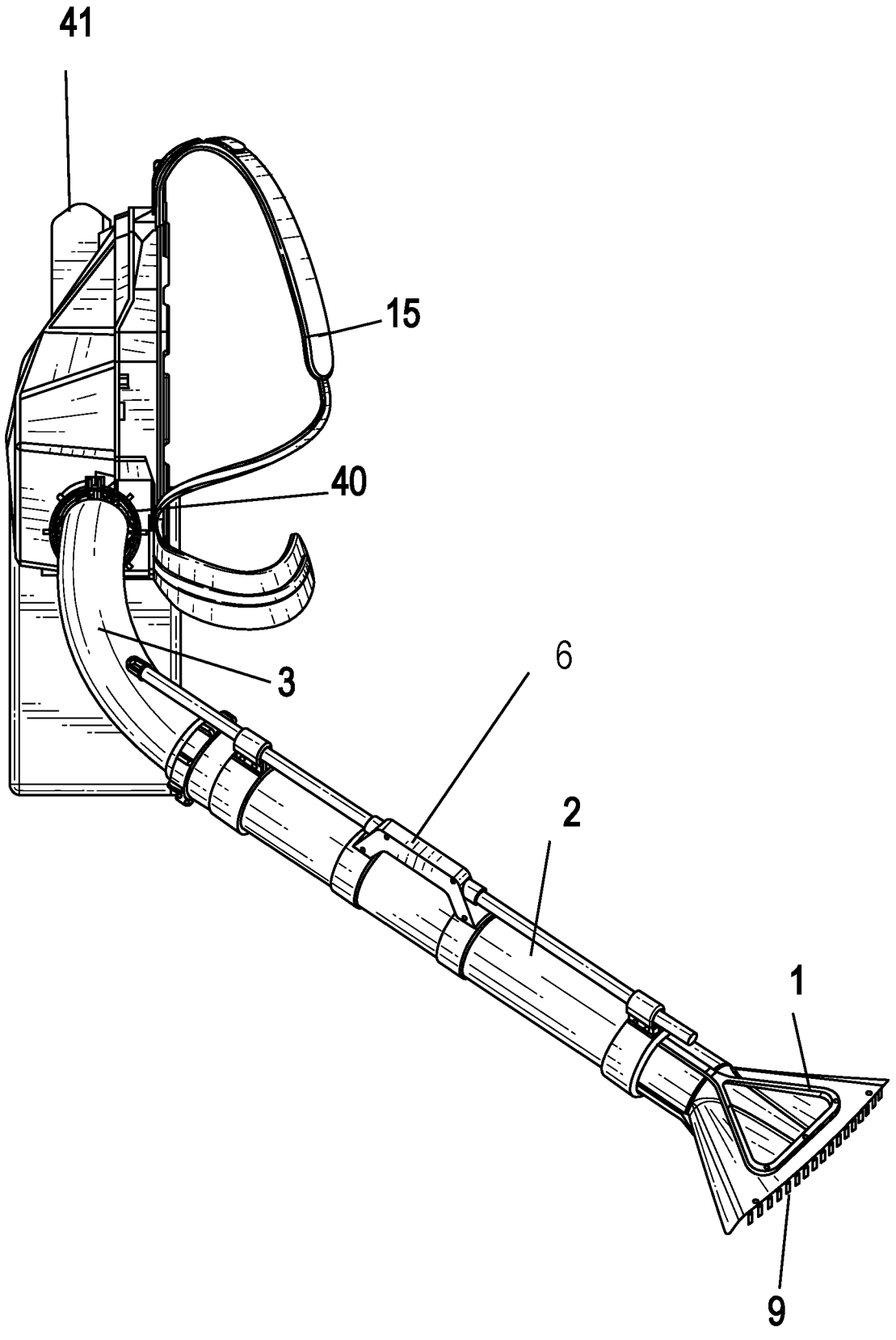
FIG. 5 is a perspective view of the invention.

FIG. 5 is a perspective view of the invention. The rake portion 1 has tines 9 that collect leaves such that a suction head can suck up leaves and other debris that were collected by the tines 9. The rake portion 1 is connected to the handle portion 2. The handle portion 2 has a hollow tube through which the debris are vacuumed up. The handle portion 2 also has a side handle 6 that allows the user to effectively grasp and control the handle and rake portions of the invention. A quick-connect connects the upper portion of the handle portion 2 to the lower portion of the connector 3. The connector 3 is a flexible tube that takes leaves from the handle portion 2 and delivers them to the vacuum portion 4. A quick rake connector 40 connect connects the upper portion of the connector 3 to an inlet in the vacuum portion. A battery 41 powers the vacuum to create suction through the connector 3 and the handle portion 2. A bag/box unit 46 stores debris that have been processed through the vacuum unit. The storage/collector box 46 is designed to be biodegradable and can be made from any material such as 2-ply paper, cardboard, paperboard or a similar material. The bag/box unit 46 is perforated to allow for air to pass through, with perforations large enough to let air pass through, but not so large as to allow leaves or leaf particles to pass through.

The storage/collector box is removable to allow a user to vacuum up enough leaves to fill the box, then quickly remove the full box and replace it with an empty box.

Figure 6:
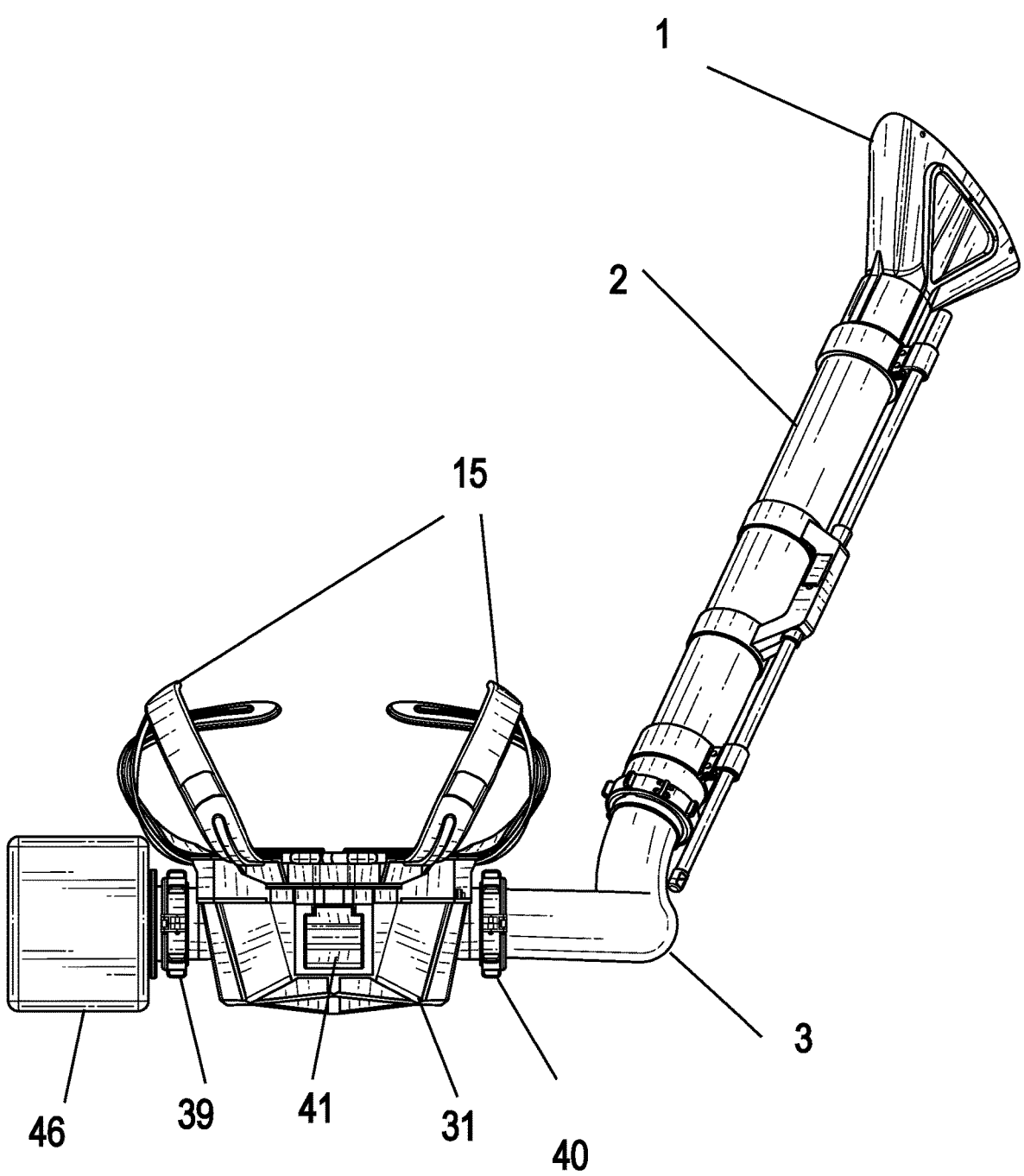
FIG. 6 is a perspective view of the invention.

FIG. 6 is a top view of the invention. The handle portion 2 is removably connected to the rake portion 1. Multiple rake portions can be interchangeably attached to the handle portion. A quick connect connects the handle portion 2 to the connector 3. A rake connection 40 quick connect connects the connector to the vacuum unit 31. A rechargeable and easily removed battery 41 provides the power, and shoulder straps 15 allow the user to carry the invention around. An exhaust bag connection 39 allows for debris mulched inside the vacuum unit 31 to be directed into the bag 46.

Figure 7:
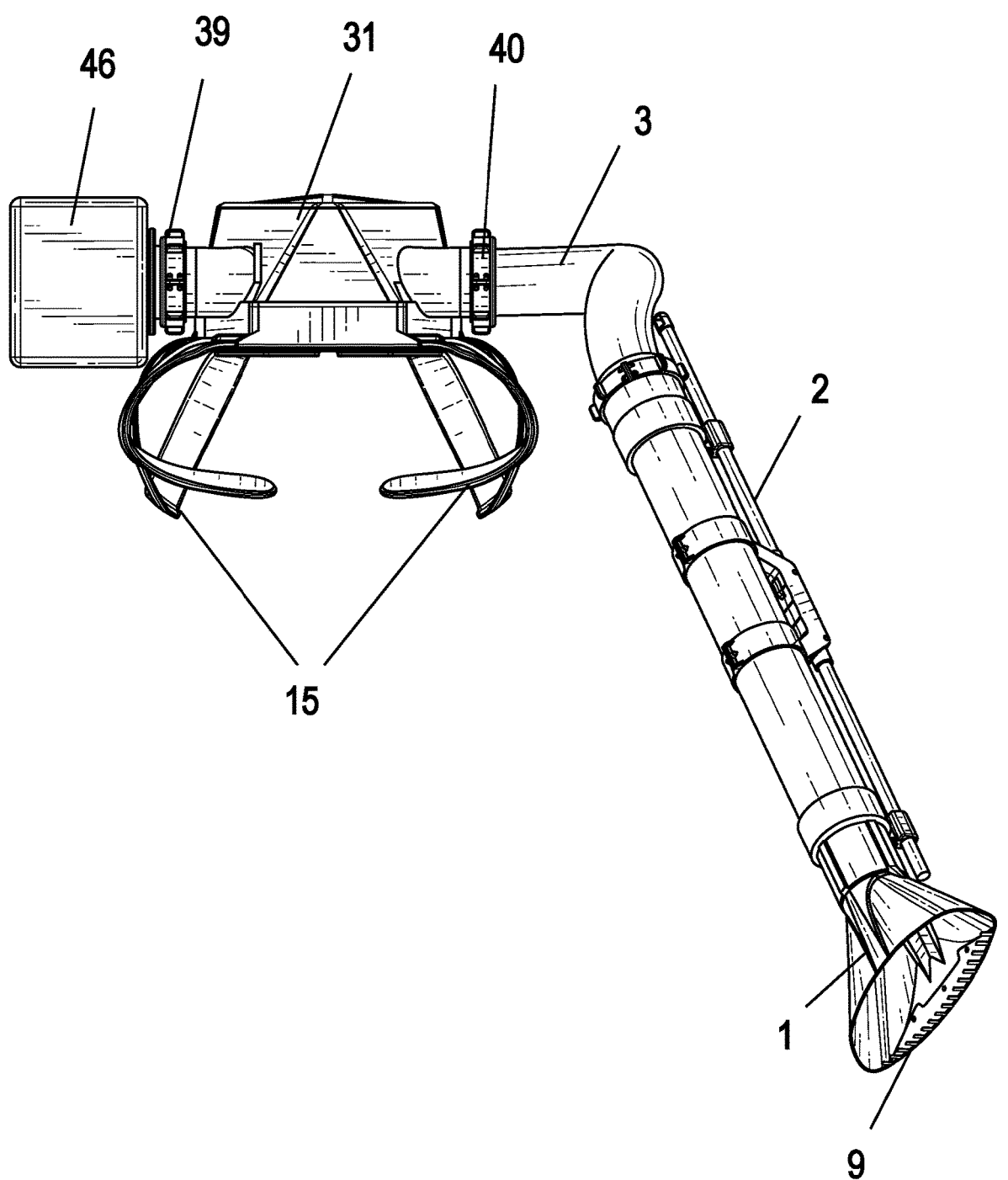
FIG. 7 is a perspective view of the invention.

FIG. 7 is a bottom view of the invention, showing how the rake portion 1, the handle portion 2 and the connector 3 are removably connected to each other. A rake connection 40 quick connect connects the connector to the vacuum unit 31. A rechargeable and easily removed battery 41 provides the power, and shoulder straps 15 allow the user to carry the invention around. An exhaust bag connection 39 allows for debris mulched inside the vacuum unit 31 to be directed into the bag 46.

Figure 8:
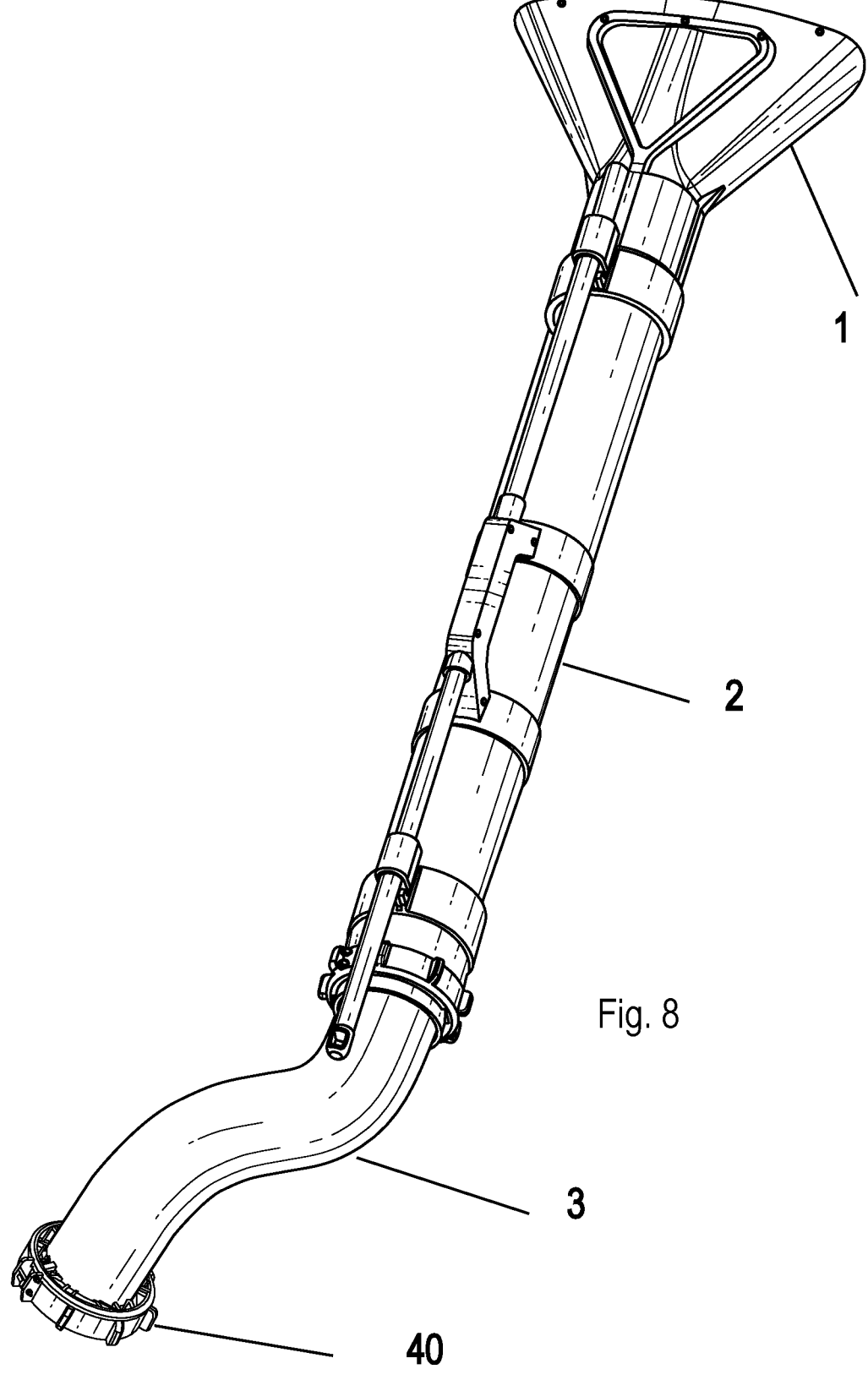
FIG. 8 is a perspective view of the rack and handle portion of the invention being used to vacuum up leaves.

FIG. 8 is a perspective view of the handle 2 and rake 1 portions of the invention. The handle portion 1 is connected to the rake portion 2 by quick connects. Another quick connect attaches the handle portion to the connector 3.

Figure 9:
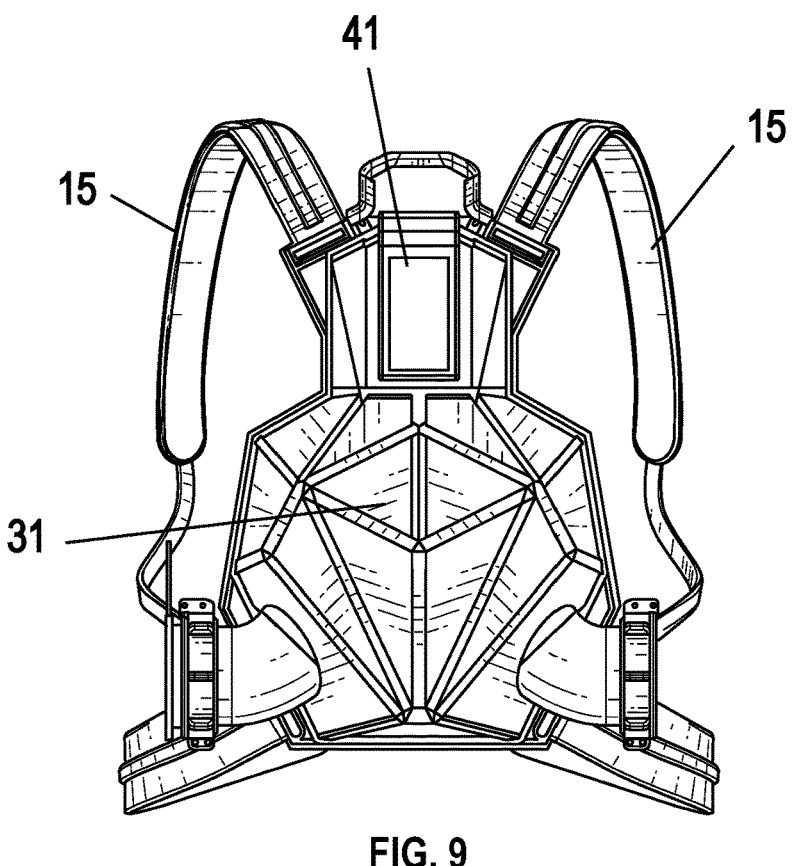
FIG. 9 is a front view of the vacuum and shoulder harness portion of the invention.

FIG. 9 is a back view of the vacuum unit 31. Shoulder straps 15 allow a user to carry the device. The rechargeable battery 41 is easily removed once its power is low.

Figure 10:
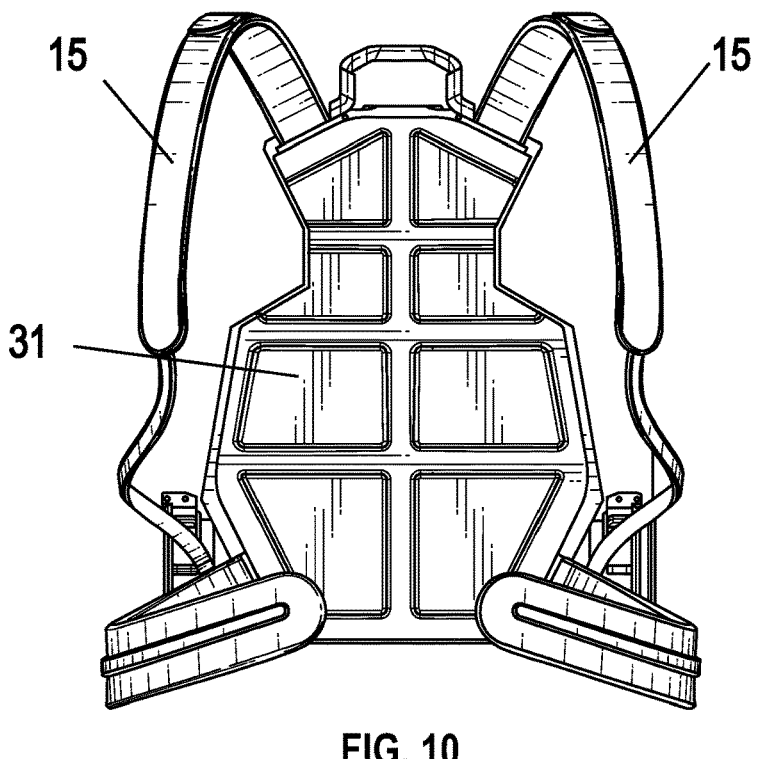
FIG. 10 is a back view of the vacuum and shoulder harness portion of the invention.

FIG. 10 is a front view of the vacuum unit 31, showing the shoulder straps 15.

Figures 11, 12:
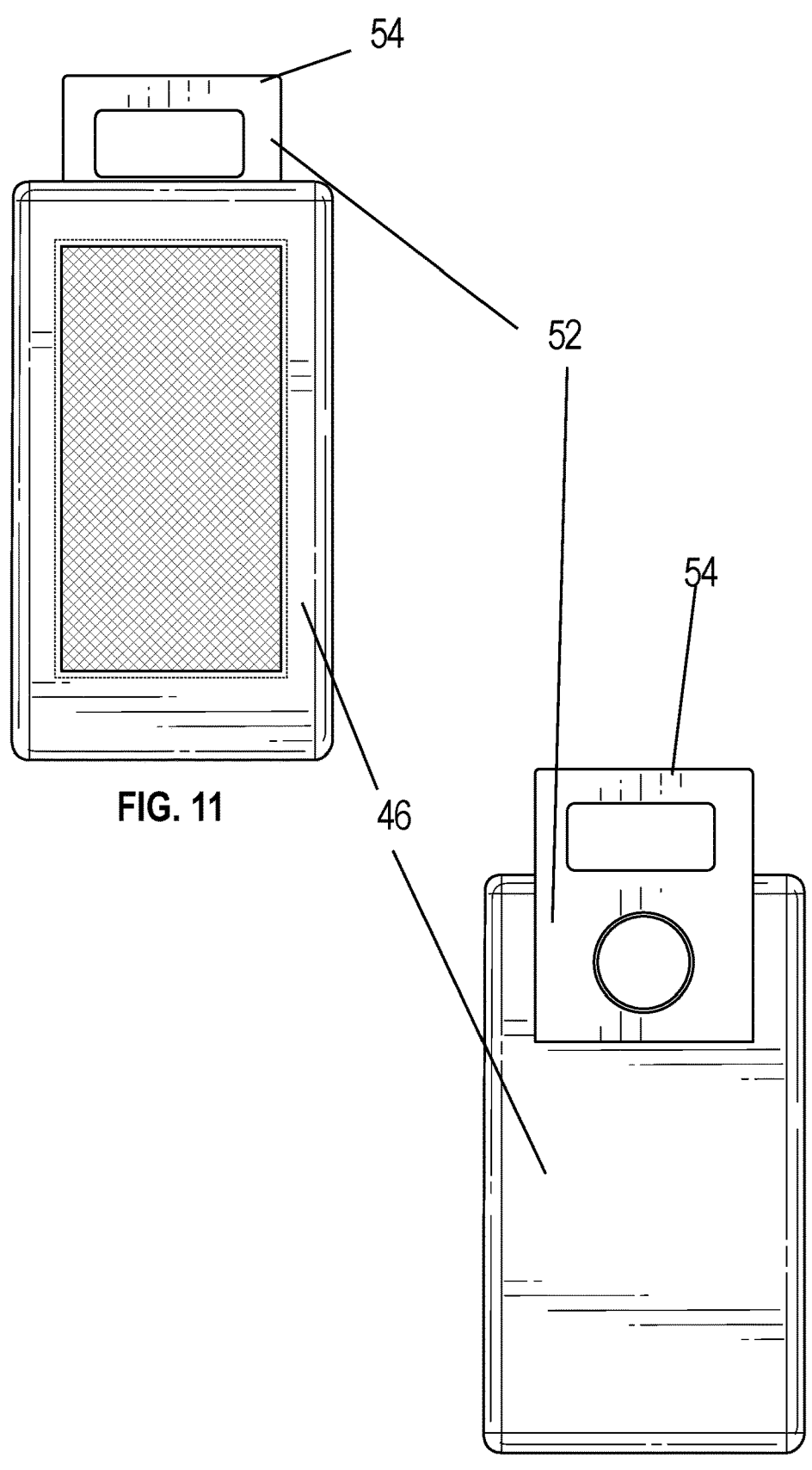
FIG. 11 is a front view of the vacuum bag with the attached card and card handle.
FIG. 12 is a back view of the vacuum bag with the attached card and card handle.

FIG. 11 is a front view of the vacuum bag 25, which is attached to a card 52 with a card handle 54. The card is a filter that has a card handle 54 by which it can be inserted into a card holder (53 in other figures). The card is attached to the bag 46. The card is easily removed and allows the exhaust port to be turned into a blower by replacing the bag 46 with the connector (3 in other figures) and the handle portion (2 in other figures). The card can also be removed from the card slot to replace the bag.

FIG. 12 is a back view of the card 52 showing the card handle 54, and the collection bag 46, to which the card is attached. The card is easily slide out of the card slot (not shown in this figure), making it easy to either replace a full bag 46 with an empty bag, or even attach the connector and handle to the exhaust port to turn the invention into a blower.

Figure 13:
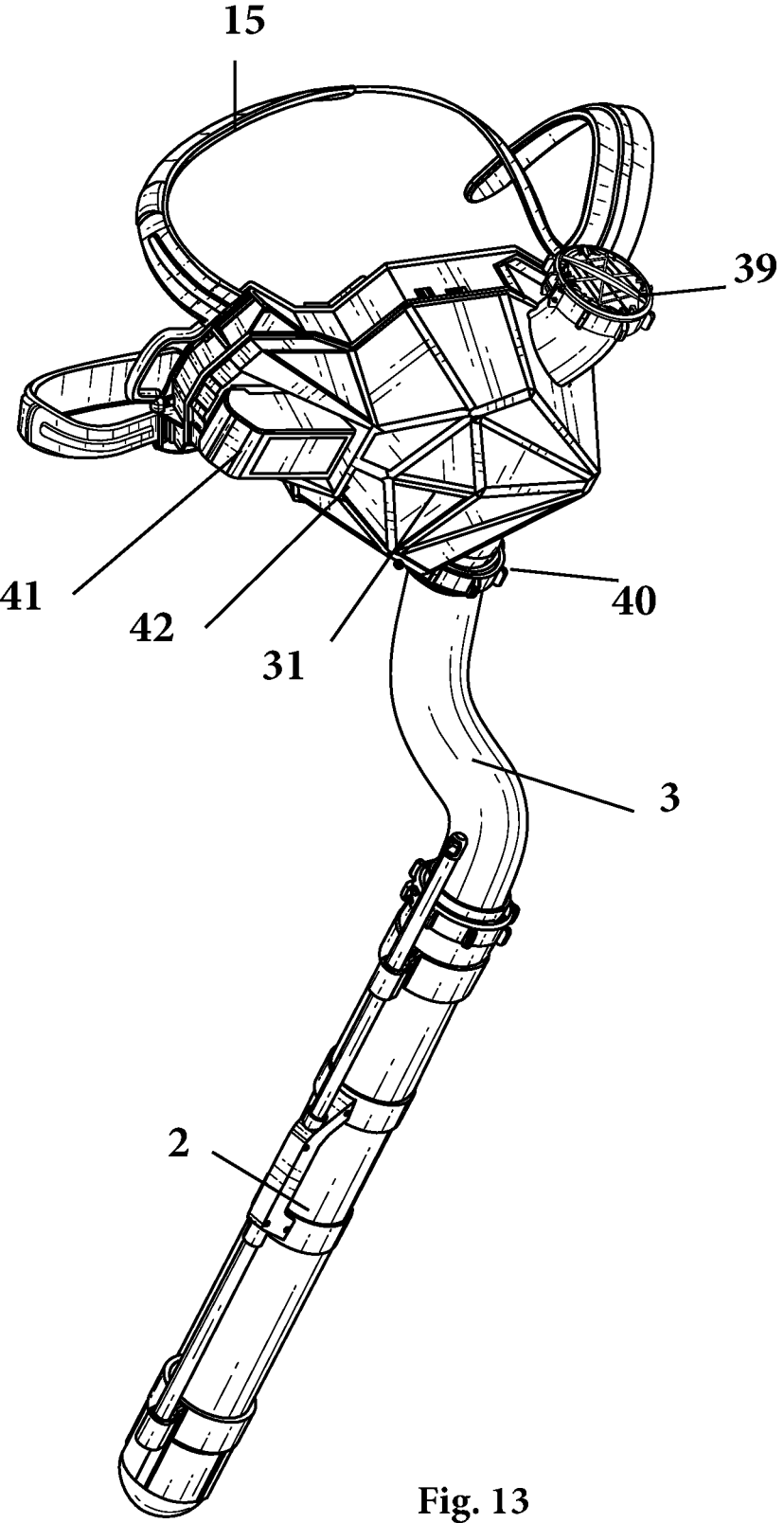
FIG. 13 is a perspective view of the invention, showing the location of the battery, shown in the blower configuration.

FIG. 13 is a perspective view of the invention, showing the location of the battery 41 and the battery housing 42, shown in blower configuration. In this configuration, the card slot and bag have been removed, and the connector 3 has been attached directly to the exhaust port 40 to turn the device into a blower.

Figure 14:
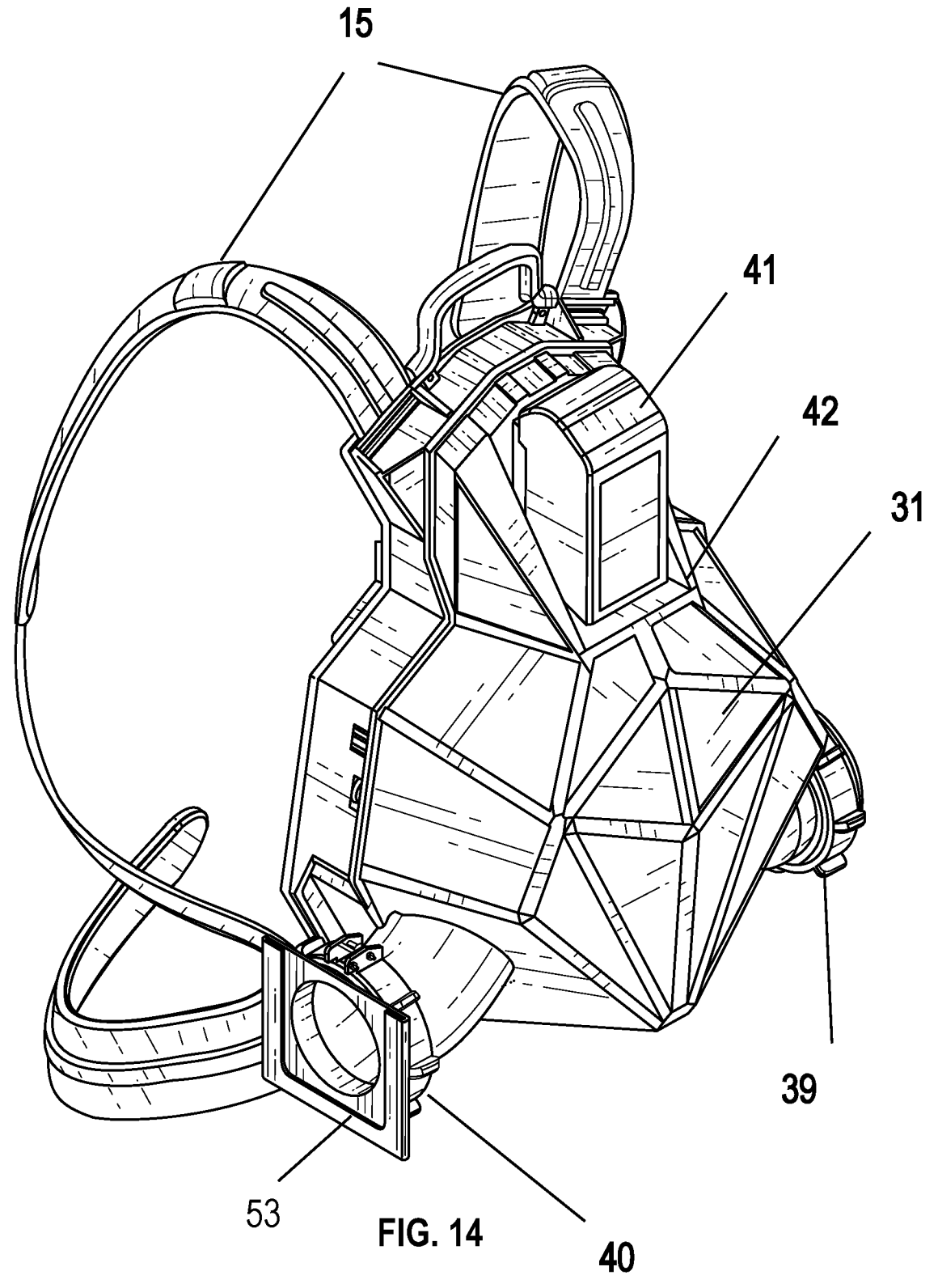
FIG. 14 is a side, perspective view of the main housing, showing the location of the easily removed rechargeable battery and the card slot attached.

FIG. 14 is a side, perspective view of the main housing, showing the location of the easily removed rechargeable battery 41 and the card slot 53 attached. The exhaust bag connection 40 is ready to be connected to a bag, and a rake connection 39 is ready to connect the connector 3 to the vacuum unit 31. A card holder or card slot 53 has been attached to the exhaust bag connection 39 is ready to accept the card (52 in other figures). With the card holder 53, a user can easily remove the bag but just pulling up on the attached card handle (see FIGS. 11 and 12).

Figure 15:
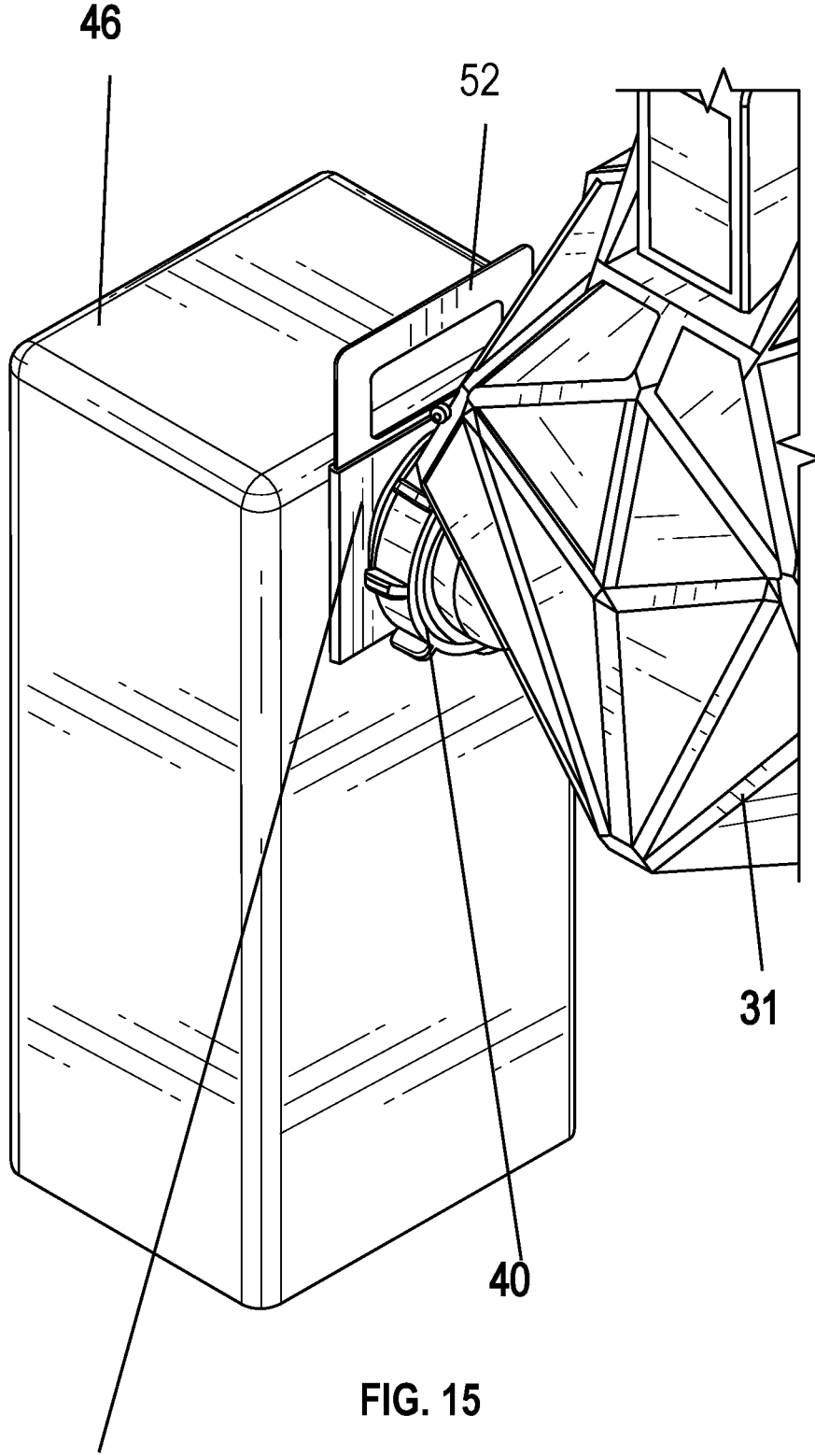
FIG. 15 is a perspective view of connection between the bag and the main housing.

FIG. 15 is a perspective view of exhaust bag connection 39 between the bag 46 and the main vacuum housing 31. A card slot 53 is attached to the exhaust bag connection 39. A bag 46 with an attached card 52 has been slide into the card slot 53. Once the bag is full, a user need only pull up on the card handle to remove the bag and replace it with another. By removing the card slot 53 from the exhaust bag connection 39, the handle portion can be connected to the exhaust bag connection and the device can be turned into a blower.

Figure 16:
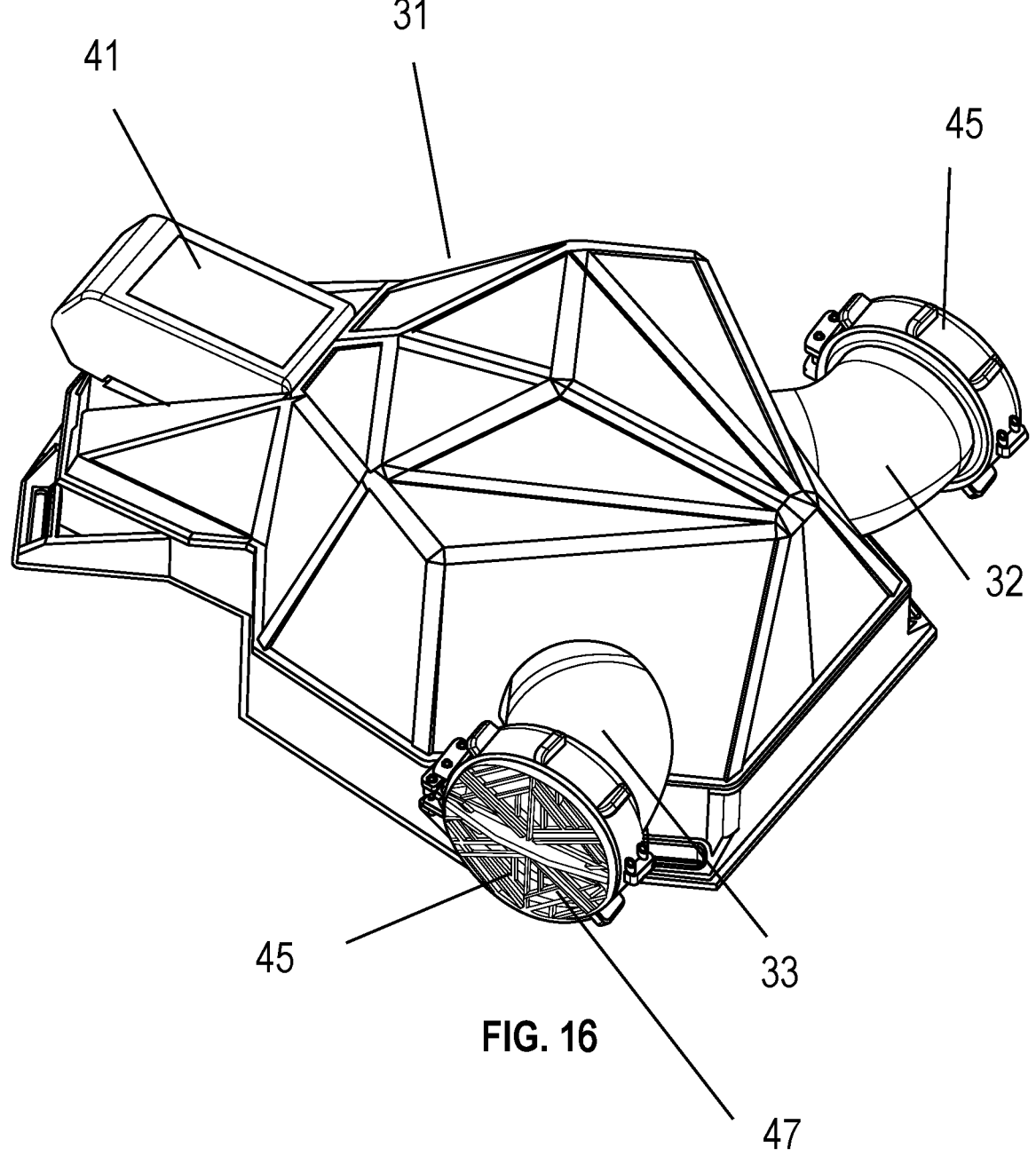
FIG. 16 is a top, perspective view of the battery, the battery housing and the main housing.

FIG. 16 is a top, perspective view of the battery 41, the battery housing 42 and the main housing of the vacuum unit 31. A backpack assembly cover 31 which has holes for an input pipe 32 and an exhaust pipe 33. Both pipes have adaptors 45 at the end to which the rake apparatus and the bag are attached. Covering the adaptors are spring-loaded protective screens 47. A rechargeable battery 48 is easily removed for replacement once its charge is gone.

Figure 17:
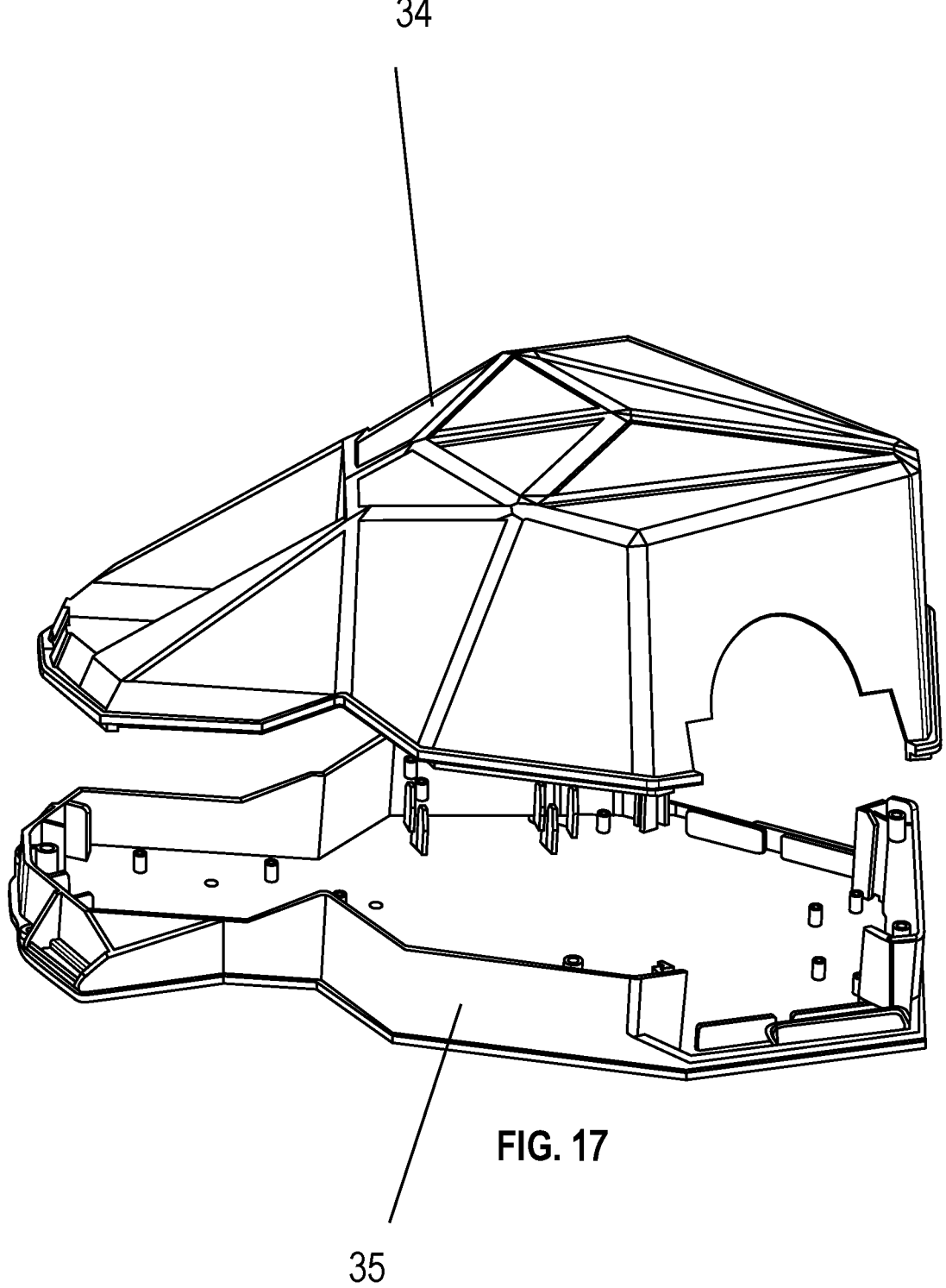
FIG. 17 is a perspective view of the two halves of the main housing.

FIG. 17 is a perspective view of the two halves of the main housing. An upper housing 34 and a lower housing 35 are connected to support the internal components and provide in ingress and egress holes through which the leaves are sucked into the housing and the resulting mulch is expelled from the housing into the collection bag.

Figure 18:
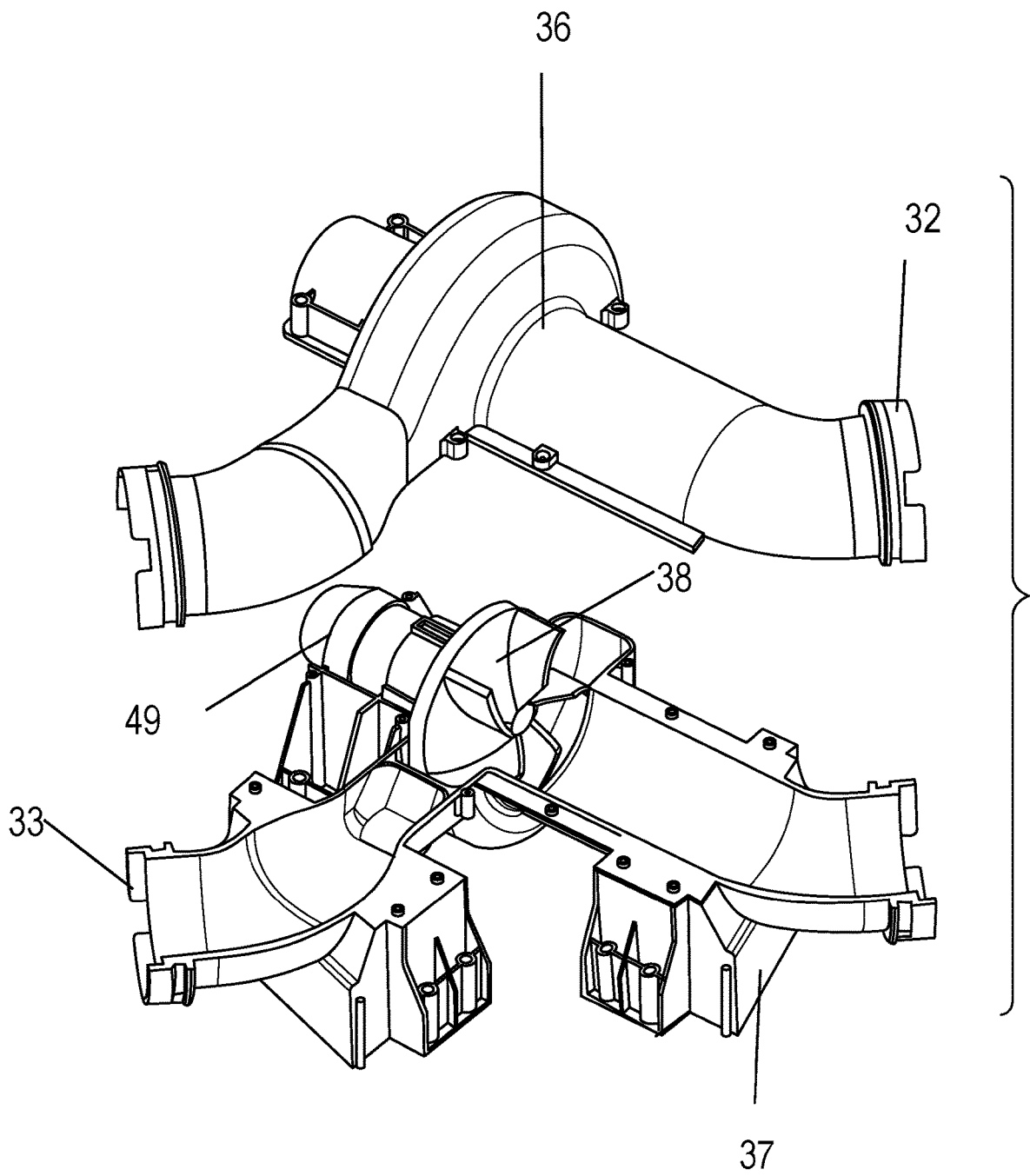
FIG. 18 is a perspective, exploded view of the top and bottom halves of the internal unit.

FIG. 18 is a perspective, exploded view of the top 36 and bottom 37 halves of the internal unit. These two sections screw together to form a tube leading to the shredding impeller 38, which is powered by an electric motor 49. The shredding impeller 38 creates a vacuum which pulls leaves, cups, uneaten food and other debris up through the attached vacuum tube or rake tube via the input pipe 32. The shredding impeller 38 then shreds the leaves and other debris into a mulch, which is then directed by a current of air created by the shredding impeller down the exhaust pipe 33 to the bag (not seen in this figure). In the "blower version" of the invention, the current of air is directed into a blower to move debris via an air current.

Figure 19:
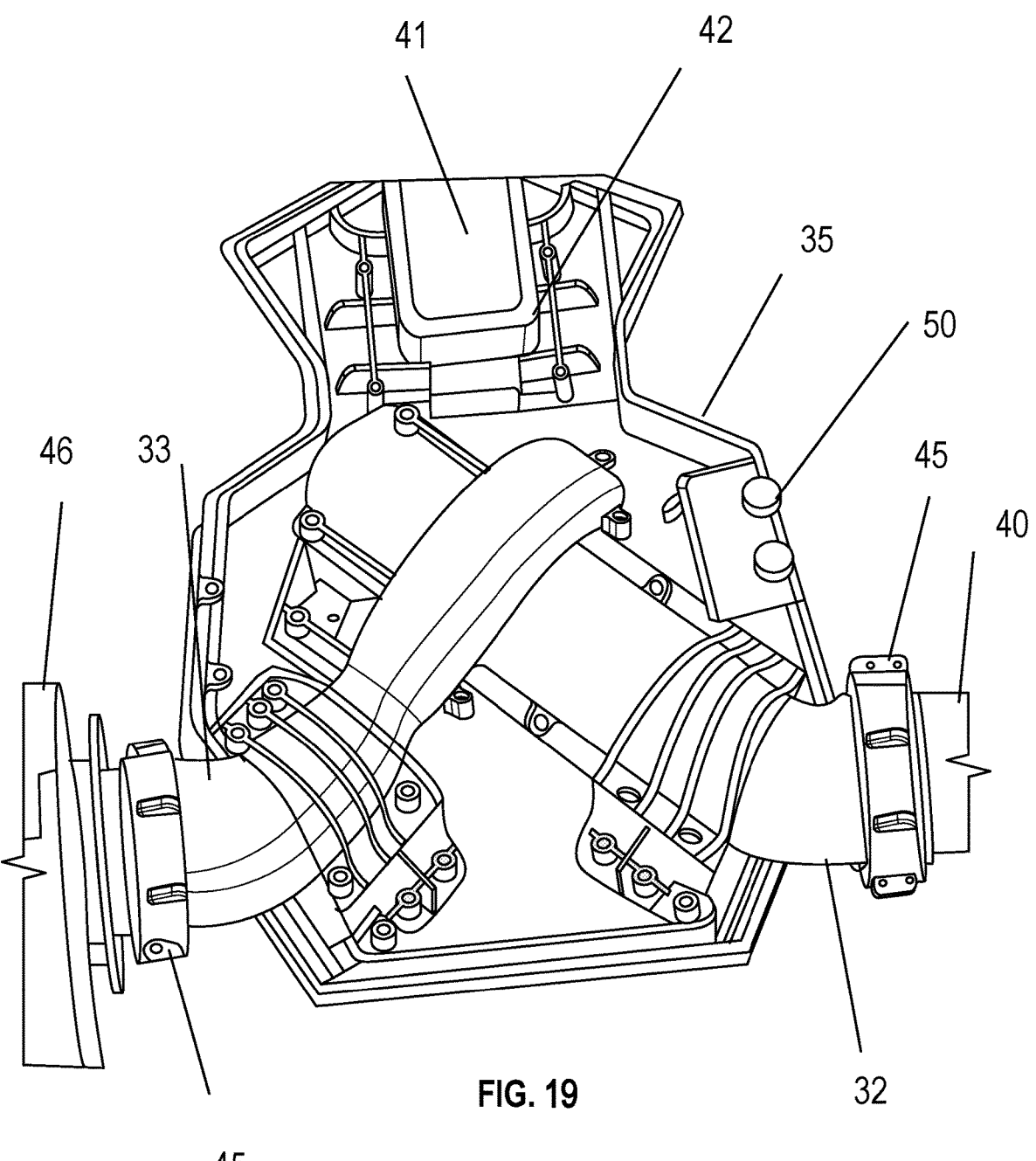
FIG. 19 is a cutaway perspective view of the internal components of the main housing.

FIG. 19 is a perspective view of the internal unit attached to the lower housing. The lower housing 35 has a battery housing 42 that contains a battery connector slot 41. Because of the location of the battery housing 42, a rechargeable battery can be easily replaced. An On/Off switch with an intensity dial 50 controls whether the device is on or off, and how quickly the shredding impeller turns. Looking at the internal workings of the invention, leaves, cups and other debris enter the housing through a flexible tube connection 40, which connect the rake/vacuum seen in other figures to the processing portion of the invention. An adaptor 45 connects the rake to the housing. The debris are sucked from the rake through the input pipe 32 to the shredding impeller (not shown in this figure). Blades of the shredding impeller force air down the exhaust pipe 33 portion, which created the vacuum needed to pull debris up from the rake to the shredding impeller. Both the input pipe 32 and the exhaust pipe 33 as well as their connection are waterproof. This allows the user to flush the system with water for cleaning. The shredding impeller can be made from a number of products, including plastic, nylon and metal. It can be removed from the housing by a professional for replacement or sharpening. After the shredding impeller has turned the debris into a mulch, the outflow of air directs the mulch through the exhaust pipe 33 through an adaptor 45 that connected the exhaust pipe 33 to a removable collection bag 46. In the "blower version" of the invention, there is no collection bag but rather the outflow of air is directed to a blowing device.

Figure 20:
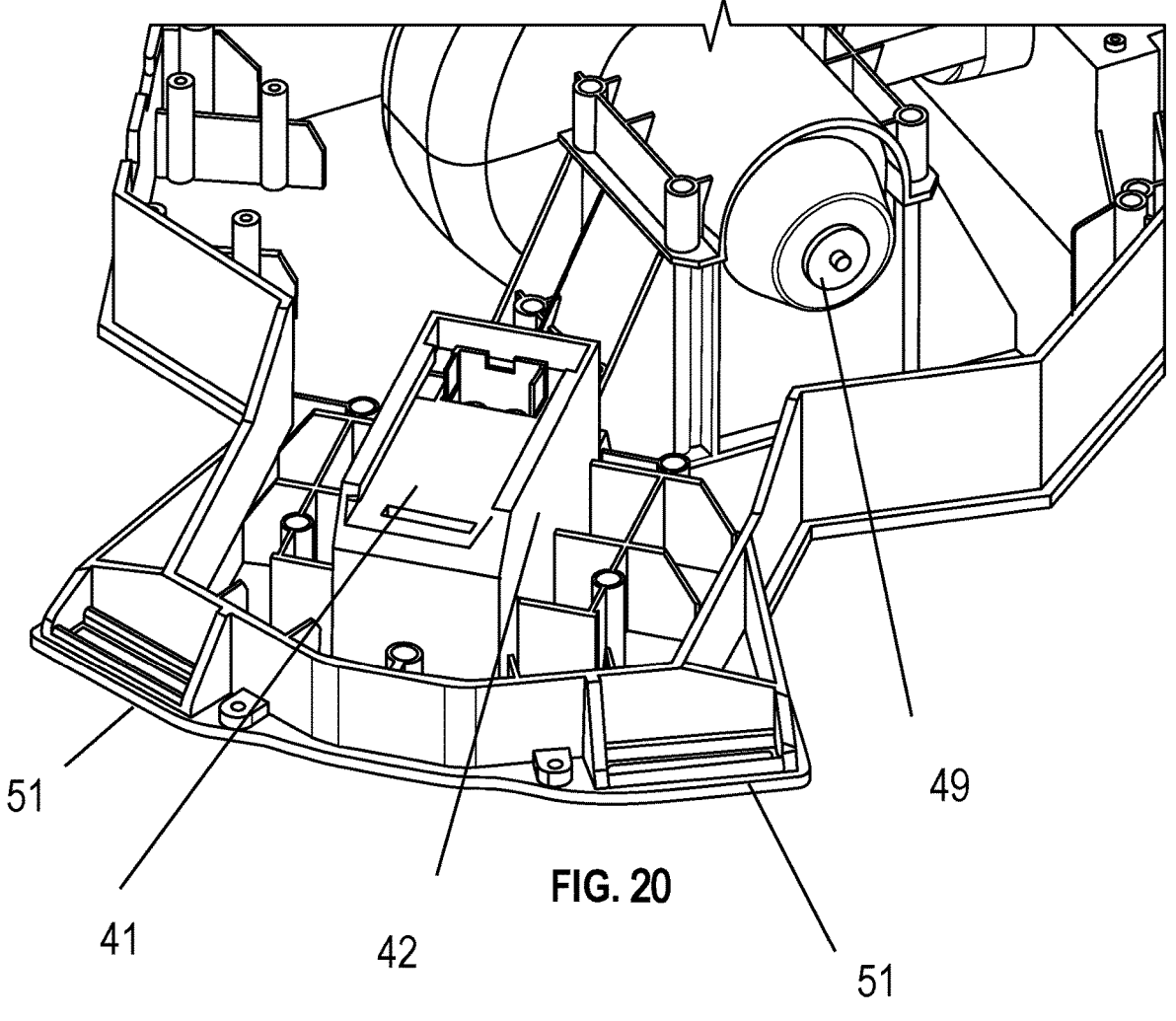
FIG. 20 is a perspective view of the battery housing in the lower half of the main housing.

FIG. 20 is a top, perspective view of the battery connector slot 41 and the battery housing 42. The battery housing is designed such that the battery can be removed and replaced easily. The electric motor 49 turns the shredding impeller, and there are two slots for backpack straps 51 built into the device.

Figure 21:
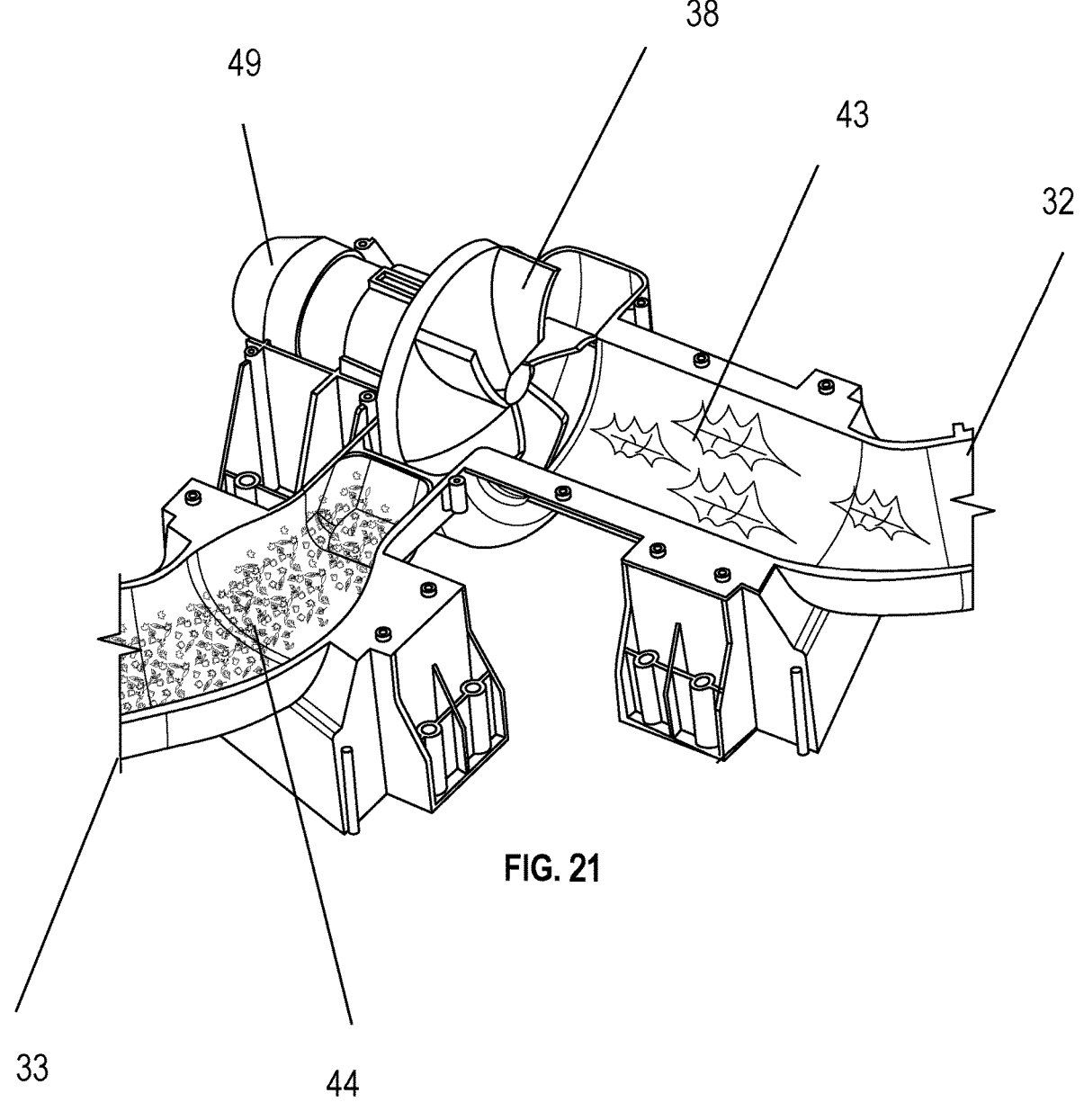
FIG. 21 is a cut-away, perspective view of the intake of leaves, the mulching by the shredding impeller, and the redirection of the resulting mulch to the collection bag.

FIG. 21 is a cut-away, perspective view of the intake of debris 43 (for purposes of illustration, leaves are used), the mulching by the shredding impeller 38, which is powered by the electric motor 49, and the redirection of the resulting mulched debris 44 to the collection bag. It should be noted that while leaves are used as the "debris" in this case, the invention is contemplated not only for leaf collection in regions where collection and disposal of deciduous leaves is a problem, but also for arenas and other large forums where collecting and disposing of trash is desirable. The same shredding impeller 36 that can mulch up leaves and cut up cups, paper and plastic plates, paper wrappers, peanuts and peanut shells, popcorn, confetti, and partially eaten food just as easily.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

REFERENCE NUMBERS USED

1. Rake portion.
2. Handle portion.
3. Connector
4. Vacuum
5. Storage/processing
6. Side handle
7. Blower handle
8. End handle
9. Tines
10. Suction head
11. Spanner
12. Exterior piece
13. Folded configuration.
14. Expanded configuration.
15. Shoulder harness
16. Quick-connect
17. Electric cord
31. Backpack Assembly Cover
32. Input pipe
33. Exhaust pipe
34. Upper housing
35. Lower housing
36. Mulching unit top half
37. Mulching unit bottom half
38. Shredding Impeller
39. Exhaust bag connection
40. Flexible Tube Connection
41. Battery Connector Slot
42. Battery housing
43. Debris
44. Mulched Debris
45. Adaptor
46. Bag or flexible tube for blower
47. Spring-loaded protective screen
48. Battery
49. Electric Motor 50. On/Off Switch, intensity dial
51. Slot for backpack straps
52. Card
53. Card slot
54. Card Handle

What I claim is:

1. A device for collecting and processing debris, consisting of, a rake portion, a handle portion, a connector, a vacuum portion, and a bag/box unit, where the handle portion additionally comprises a hollow tube, where the rake portion additionally comprises a plurality of tines and a suction head, where the suction head is connected to the hollow tube, and where the hollow tube is connected to the connector by a first quick connect adaptor, and where the connector is connected to the vacuum portion by a second quick connect adaptor, Where the vacuum portion consists of an upper housing and a lower housing, where the upper housing and the lower housing each have two semicircular cavities, where the two semicircular cavities in the upper housing and the two semicircular cavities in the lower housing line up to form two circular openings when the upper housing is attached to the lower housing, Wherein the vacuum portion additionally comprises a mulching unit upper half and a mulching unit lower half, a battery housing, a battery connector slot, an electric motor and a mulching impeller, where the battery housing accepts a rechargeable battery through the battery connector slot, wherein the electric motor powers the mulching impeller, where the mulching impeller has a plurality of curved blades, wherein the mulching impeller sits in a circular depression molded into the upper housing and the lower housing, wherein, when the mulching impeller spins, the mulching impeller takes a quantity of air from an input pipe, and redirects the quantity of air through the exhaust pipe, creating a vacuum in the input pipe, wherein the vacuum sucks up a quantity of debris through the rake portion and the hollow tube, wherein the mulching impeller takes in a quantity of debris, and shreds the quantity of debris into a quantity of mulched debris, wherein the quantity of mulched debris is extruded into the exhaust pipe, wherein the input pipe is connected to the handle portion at an input adaptor, where the input adaptor is flexible tube connection, and wherein the exhaust pipe is connected to an outside portion by an exhaust pipe adaptor, wherein the input adaptor and the exhaust pipe adaptor each has a spring-loaded protective screen, wherein the lower housing additionally comprises an on/off switch and an intensity dial, wherein the plurality of tines direct a quantity of leaves toward the suction head, where the vacuum generates an amount of suction, where the amount of suction picks up the quantity of leaves from in front of the suction head and pulls them through the suction head, first through the hollow tube, second through the connector, and third, into the vacuum, and fourth, through the mulching shredding impeller and exhausted into the bag/box unit, where the vacuum portion additionally comprises a shoulder harness, where the shoulder harness comprises two shoulder straps, wherein the vacuum portion is worn as a backpack, where the vacuum portion additionally comprises a waist harness, where the handle portion is hollow, such that the hollow tube is the inside of the handle portion, where the handle portion additionally comprises at least one side handle, where the vacuum portion additionally comprises a shredder, where the shredder cuts the quantity of leaves into a plurality of small particles, where the vacuum portion expels the plurality of small particles from a side exhaust vent into the attached bag/box unit, where the bag/box unit has a folded configuration and an expanded configuration, where the rake portion is attached to the handle portion by an interchangeable connector, where a plurality of rake portions can be attached to the handle portion through the interchangeable connector.

2. The device of claim 1, wherein, the upper housing is attached to the lower housing by one or more screws.

3. The device of claim 2, wherein the exhaust portion additionally comprises a card holder and the bag/box unit comprises a card and a bag, wherein the bag is removable from the device for emptying and reattachment, wherein the card is easily removable from a card slot by a card handle and allows the bag to be easily replaceable.

4. The device of claim 2, wherein the outside portion is a blower, wherein the card is removable, and the bag is removed, and the connector and handle portion are attached to the exhaust port to create the blower.

5. A vacuum/blower device for collecting and processing debris, comprising a rake portion, a handle portion, a connector, a vacuum portion, and a bag/box unit, where the handle portion additionally comprises a hollow tube, and where the hollow tube is connected to the connector by a first quick connect adaptor, and where the connector is connected to the vacuum portion by a second quick connect adaptor, wherein an exhaust portion of the vacuum portion additionally comprises a card holder and the bag/box unit comprises a card and a bag, wherein the bag is removable from the device for emptying and reattachment, wherein the card is easily removable from a card slot by a card handle and allows the bag to be easily replaceable, wherein the card slot is removable, and the bag is removable, and the connector and handle portion are attached to the exhaust port to create a blower, wherein the rake portion additionally comprises a plurality of tines and a suction head, where the suction head is connected to the hollow tube, wherein the vacuum portion consists of an upper housing and a lower housing, where the upper housing and the lower housing each have two semicircular cavities, where the two semicircular cavities in the upper housing and the two semicircular cavities in the lower housing line up to form two circular openings when the upper housing is attached to the lower housing, wherein the vacuum portion additionally comprises a mulching unit upper half and a mulching unit lower half, a battery housing, a battery connector slot, an electric motor and a mulching impeller, where the battery housing accepts a rechargeable battery through the battery connector slot, wherein the electric motor powers the mulching impeller, where the mulching impeller has a plurality of curved blades, wherein the mulching impeller sits in a circular depression molded into the upper housing and the lower housing.

6. The device of claim 5, wherein, when the mulching impeller spins, the mulching impeller takes a quantity of air from an input pipe, and redirects the quantity of air through the exhaust pipe, creating a vacuum in the input pipe, wherein the vacuum sucks up a quantity of debris through the rake portion and the hollow tube.

7. The device of claim 6, wherein the mulching impeller takes in a quantity of debris, and shreds the quantity of debris into a quantity of mulched debris, wherein the quantity of mulched debris is extruded into the exhaust pipe.

8. The device of claim 7, wherein the input adaptor and the exhaust pipe adaptor each has a spring-loaded protective screen.

9. The device of claim 8, wherein the lower housing additionally comprises an on/off switch and an intensity dial.

10. The device of claim 9, wherein the input pipe is connected to the handle portion at an input adaptor, where the input adaptor is flexible tube connection, and wherein the exhaust pipe is connected to an outside portion by an exhaust pipe adaptor.

11. The device of claim 10, wherein the plurality of tines direct a quantity of leaves toward the suction head, where the vacuum generates an amount of suction, where the amount of suction picks up the quantity of leaves from in front of the suction head and pulls them through the suction head, first through the hollow tube, second through the connector, and third, into the vacuum, and fourth, through the mulching shredding impeller and exhausted into the bag/box unit, where the vacuum portion additionally comprises a shoulder harness, where the shoulder harness comprises two shoulder straps, wherein the vacuum portion is worn as a backpack, where the vacuum portion additionally comprises a waist harness, where the handle portion is hollow, such that the hollow tube is the inside of the handle portion, where the handle portion additionally comprises at least one side handle, where the vacuum portion additionally comprises a shredder, where the shredder cuts the quantity of leaves into a plurality of small particles, where the vacuum portion expels the plurality of small particles from a side exhaust vent into the attached bag/box unit, where the bag/box unit has a folded configuration and an expanded configuration, where the rake portion is attached to the handle portion by an interchangeable connector, where a plurality of rake portions can be attached to the handle portion through the interchangeable connector.

12. The device of claim 11, wherein, the upper housing is attached to the lower housing by one or more screws.

13. A bag for collecting mulched debris, comprising, a bag with an attached card, wherein the card has a card handle, wherein the card removably fits into a card slot, where the card slot is attached to an exhaust port of a vacuum mulching device, where the card slot is attached to a vacuum mulching unit, where the vacuum mulching unit comprises a rake portion, a handle portion, a connector, a vacuum portion, and a bag/box unit, where the handle portion additionally comprises a hollow tube, where the rake portion additionally comprises a plurality of tines and a suction head, where the suction head is connected to the hollow tube, and where the hollow tube is connected to the connector by a first quick connect adaptor, and where the connector is connected to the vacuum portion by a second quick connect adaptor, where the vacuum portion consists of an upper housing and a lower housing, where the upper housing and the lower housing each have two semicircular cavities, where the two semicircular cavities in the upper housing and the two semicircular cavities in the lower housing line up to form two circular openings when the upper housing is attached to the lower housing, wherein the vacuum portion additionally comprises a mulching unit upper half and a mulching unit lower half, a battery housing, a battery connector slot, an electric motor and a mulching impeller, where the battery housing accepts a rechargeable battery through the battery connector slot, wherein the electric motor powers the mulching impeller, where the mulching impeller has a plurality of curved blades, wherein the mulching impeller sits in a circular depression molded into the upper housing and the lower housing, wherein, when the mulching impeller spins, the mulching impeller takes a quantity of air from an input pipe, and redirects the quantity of air through the exhaust pipe, creating a vacuum in the input pipe, wherein the vacuum sucks up a quantity of debris through the rake portion and the hollow tube, wherein the mulching impeller takes in a quantity of debris, and shreds the quantity of debris into a quantity of mulched debris, wherein the quantity of mulched debris is extruded into the exhaust pipe, wherein the input pipe is connected to the handle portion at an input adaptor, where the input adaptor is flexible tube connection, and wherein the exhaust pipe is connected to an outside portion by an exhaust pipe adaptor, wherein the input adaptor and the exhaust pipe adaptor each has a spring-loaded protective screen, wherein the lower housing additionally comprises an on/off switch and an intensity dial, wherein the plurality of tines direct a quantity of leaves toward the suction head, where the vacuum generates an amount of suction, where the amount of suction picks up the quantity of leaves from in front of the suction head and pulls them through the suction head, first through the hollow tube, second through the connector, and third, into the vacuum, and fourth, through the mulching shredding impeller and exhausted into the bag/box unit, where the vacuum portion additionally comprises a shoulder harness, where the shoulder harness comprises two shoulder straps, wherein the vacuum portion is worn as a backpack, where the vacuum portion additionally comprises a waist harness, where the handle portion is hollow, such that the hollow tube is the inside of the handle portion, where the handle portion additionally comprises at least one side handle, where the vacuum portion additionally comprises a shredder, where the shredder cuts the quantity of leaves into a plurality of small particles, where the vacuum portion expels the plurality of small particles from a side exhaust vent into the attached bag/box unit, where the bag/box unit has a folded configuration and an expanded configuration, where the rake portion is attached to the handle portion by an interchangeable connector, where a plurality of rake portions can be attached to the handle portion through the interchangeable connector, wherein, the upper housing is attached to the lower housing by one or more screws.

* * * * *